REGENERATED CELLULOSE

Inventor
JULIEN LACHICHE
By
Attorney 3,060,514
MANUFACTURE OF AN ARTIFICIAL CHAMOIS
LEATHER ARTICLE
Julien Lachiche, Paris, France, assignor to Novacel,
Paris, France, a corporation of France
Filed Mar. 4, 1960, Ser. No. 12,705
Claims priority, application France Jan. 31, 1955
2 Claims. (Cl. 18—48)

This invention relates to a process for the manufacture of an artificial chamois leather article and more particularly to the production of artificial chamois leather from regenerated cellulose, with reinforcing fabric.

This application is a continuation in part of my copending application Serial No. 562,611, filed January 31, 1954 and now abandoned for manufacture of an artificial chamois leather article.

More specifically the invention relates to a process wherein a thick paste of viscose, soluble crystals and fibers is spread into a thin layer and coagulated and fixed followed by the usual finishing and drying treatments.

For making reinforced artificial chamois leather, one or two thin layers of a paste consisting of viscose, water-soluble crystals and hemp fibers are spread onto a cloth (preferably of coarse mesh) in such a way that the fibers remain unoriented in the viscose layer after which the viscose is coagulated. A network of cavities and projections is impressed in the viscose paste before the coagulation so as to impart a waffled appearance to the resulting chamois leather.

An object of the invention is to provide a process of the above type wherein orientation of the fibers and the resultant laminar structure, which is conducive to cracking in a direction parallel to the two faces or to detachment of the reinforcing support is eliminated.

According to the present invention the improved process comprises forming the articles in a suitable mold from a thick paste of the above material. The process may be rendered semi-continuous by employing a plurality of molds arranged to operate in sequence.

The mold may comprise a fixed member and a cooperating movable member having ribs, projections and cavities forming a pattern which may be impressed on the article.

The paste may be molded onto a reinforcing fabric layer (e.g. coarse mesh cloth) or the fabric layer may be sandwiched between two layers of paste, which, if desired, may be of different thicknesses or differently colored by appropriate pigments.

After the paste has been pressed in the mold, it is coagulated by thermal action (for example by heating the mold in an oven), or by electrical means with direct heating, or by any other method. Molds can also be employed which are provided with means for the passage of liquids and which are immersed, for example, in neutral or acid salt baths for the coagulation.

The coagulated articles thus produced are removed from the mold, fixed, washed, if necessary, bleached, treated with dressing medium, plasticized and then dried.

The paste employed is of the usual type having a regenerated cellulose base. Thus it may consist of a pasty mixture of viscose, water-soluble crystals and fibers. A suitable paste is thus provided by a pasty mixture of uncoagulated high-viscosity viscose having a high xanthate sulphur content, fine sodium sulphate crystals, and hemp, flax, or other fibers.

The fibers are randomly disposed in the viscose paste without orientation and a mass of the paste is placed in the mold without previous working such as extrusion or rolling which would tend to cause orientation of the fibers. When the layers of such paste are compressed in the mold between mold members having a waffle grid pattern, the projections of the grid form indentations in the surface of the material. Since the movement of the mold elements is normal to the surface of the layers of viscose no horizontal orientation is effected and the pressure of the mold projections causes the fibers to extend vertically as well as horizontally in the impressed portions of the product. Hence the fibers in the final product are randomly oriented in both the horizontal and vertical planes and no plane of weakness appears in the finished material.

This operation is indicated diametrically in the drawing wherein.

Figure 1:
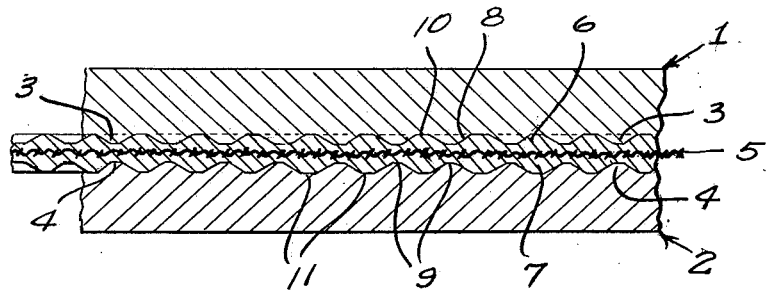
FIG. 1 is a sectional view of a mold for carrying out the impressing step.

In FIG. 1 an upper mold platen 1 and lower mold platen 2 are formed with projections 3 and 4 respectively forming a waffle grid pattern on the faces of the platens. A fabric layer 5 is disposed in this mold between layers 6 and 7 of a viscose paste of the type above referred to. It will be noted that the projections 3 and 4 on the platens cause indentations 8 and 9 in the two faces of the viscose layers 6 and 7 with ridges 10 and 11 formed between the indentations 8 and 9.

Figure 2:
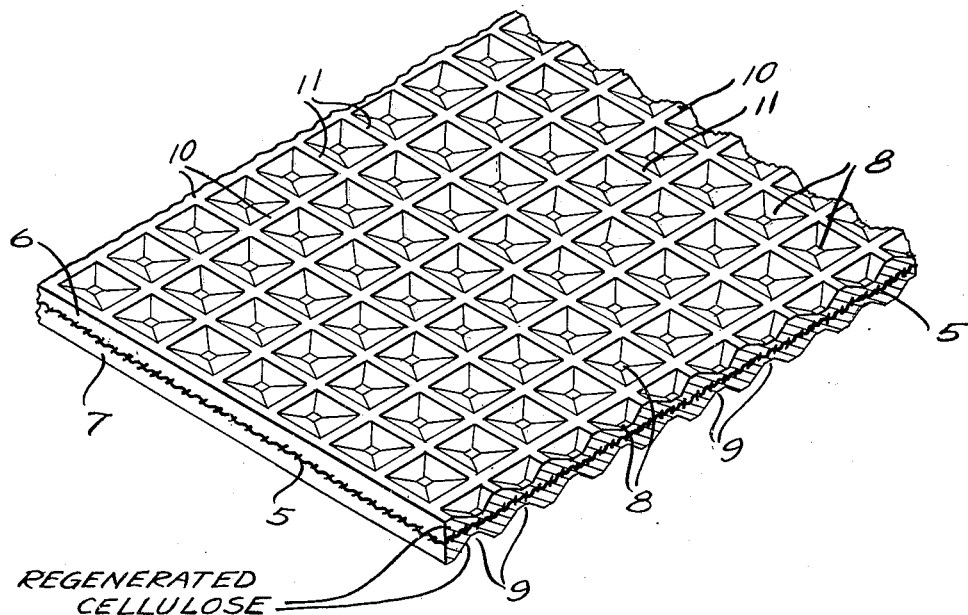
FIG. 2 is a perspective view of an artificial chamois leather product according to the present invention.

The ridges 10 and 11 and depressions 8 and 9 use a waffle grid pattern on the two faces of the product as shown in FIG. 2. The indentations 8 and 9 terminate a substantial distance from the fabric layer 5 so that continuous layers of regenerated cellulose are formed on both sides thereof to produce an artificial chamois effect.

What is claimed is:

1. The method of making artificial chamois leather articles which comprises incorporating unoriented fibers in a paste composed of uncoagulated viscose and water-soluble crystals, spreading a layer of said paste onto a coarse mesh reinforcing fabric, placing the fabric carrying said layer of paste in a mold having projections adapted to impress indentations in said layer in a waffle pattern, compressing said layer in said mold to cause the mold projections to rearrange the fibers to produce a combination of vertical and horizontal partial reorientation of the fibers in said layer and coagulating said viscose while so impressed so as to prepare a product wherein the viscose layer is of unitary form, contains fibers in partially unoriented state, and is firmly bonded to the reinforcing fabric.

2. The method set forth in claim 1 in which said reinforcing fabric is disposed between two layers of said paste and in which both of said layers are impressed with a waffle pattern during coagulation.

References Cited in the file of this patent
UNITED STATES PATENTS

| | | |
|---|---|---|
| 2,116,611 | Vautier | May 10, 1938 |
| 2,295,823 | Banigan et al. | Sept. 15, 1942 |
| 2,540,906 | Overton et al. | Feb. 6, 1951 |
| 2,671,743 | Lindquist | Mar. 9, 1954 |